United States Patent
Usgaonkar et al.

(10) Patent No.: US 9,342,417 B2
(45) Date of Patent: May 17, 2016

(54) LIVE NV REPLAY FOR ENABLING HIGH PERFORMANCE AND EFFICIENT TAKEOVER IN MULTI-NODE STORAGE CLUSTER

(71) Applicant: NetApp, Inc., Sunnyvale, CA (US)

(72) Inventors: Ameya Prakash Usgaonkar, Old Goa (IN); Siddhartha Nandi, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 188 days.

(21) Appl. No.: 14/280,139

(22) Filed: May 16, 2014

(65) Prior Publication Data

US 2015/0261633 A1 Sep. 17, 2015

(30) Foreign Application Priority Data

Mar. 13, 2014 (IN) .............................. 743/DEL/2014

(51) Int. Cl.
*G06F 11/00* (2006.01)
*G06F 11/20* (2006.01)
*H04L 29/08* (2006.01)

(52) U.S. Cl.
CPC ........ *G06F 11/2064* (2013.01); *H04L 67/1097* (2013.01)

(58) Field of Classification Search
USPC .......................................................... 714/4.1
See application file for complete search history.

(56) References Cited

U.S. PATENT DOCUMENTS

| | | |
|---|---|---|
| 7,249,150 B1 | 7/2007 | Watanabe et al. |
| 7,376,866 B1 * | 5/2008 | Sarma ................. G06F 11/1471 714/15 |
| 7,613,947 B1 | 11/2009 | Coatney et al. |
| 7,620,669 B1 | 11/2009 | Novick et al. |
| 7,730,153 B1 | 6/2010 | Gole et al. |
| 7,844,584 B1 | 11/2010 | Griess |
| 7,895,286 B1 | 2/2011 | Kilbourne, II et al. |
| 7,962,686 B1 | 6/2011 | Tracht |
| 8,688,798 B1 | 4/2014 | Lentini |
| 2003/0061537 A1 * | 3/2003 | Cha ..................... G06F 11/1471 714/16 |
| 2004/0215998 A1 * | 10/2004 | Buxton ............... G06F 11/1474 714/2 |

OTHER PUBLICATIONS

Recio et al., A Remote Direct Memory Access Protocol Specification, Request for Comments: 5040, Oct. 2007, 66 Pages.

* cited by examiner

*Primary Examiner* — Sarai Butler
(74) *Attorney, Agent, or Firm* — LeClairRyan, a Professional Corporation

(57) ABSTRACT

A live non-volatile (NV) replay technique enables a partner node to efficiently takeover a failed node of a high-availability pair in a multi-node storage cluster by dynamically replaying operations synchronously logged in a non-volatile random access memory (NVRAM) of the partner node, while also providing high performance during normal operation. Dynamic live replay may be effected through interpretation of metadata describing the logged operations. The metadata may specify a location and type of each logged operation within a partner portion of the NVRAM, as well as any dependency among the logged operation and any other logged operations that would impose an ordering constraint. During normal operation, the partner node may consult the metadata to identify dependent logged operations and dynamically replay those operations to satisfy one or more requests. Upon failure of the node, the partner node may replay, in parallel, those logged operations having no imposed ordering constraint, thereby reducing time needed to complete takeover of the failed node.

20 Claims, 7 Drawing Sheets

LIVE NV REPLAY FOR ENABLING HIGH PERFORMANCE AND EFFICIENT TAKEOVER IN MULTI-NODE STORAGE CLUSTER

RELATED APPLICATION

The present application claims priority to commonly owned Indian Patent Application Serial No. 743/DEL/2014, entitled Live NV Replay for Enabling High Performance and Efficient Takeover in Multi-Node Storage Cluster, by Ameya Prakash Usgaonkar et al., filed on Mar. 13, 2014, the contents of which are hereby incorporated by reference.

BACKGROUND

1. Technical Field

The present disclosure relates to storage systems and, more specifically, to high performance and availability of data in a cluster of storage systems.

2. Background Information

A storage system typically includes one or more storage devices, such as disks, into which information (i.e. data) may be entered, and from which data may be obtained, as desired. The storage system (i.e., node) may logically organize the data stored on the devices as storage containers, such as files, logical units (luns), and/or aggregates having one or more volumes that hold files and/or luns. To improve the performance and availability of the data contained in the storage containers, a plurality of nodes may be interconnected as a cluster configured to provide storage service relating to the organization of the storage containers and with the property that when one node fails another node may service data access requests, i.e., operations, directed to the failed node's storage containers.

In such a cluster, two nodes may be interconnected as a high availability (HA) pair configured to operate as "shared nothing" until one of the nodes fails. That is, each node (i.e., the owner node) may service the operations directed to its storage containers and only services the operations directed to the storage containers of another node (i.e., the local node) after a failure of that node, which triggers a takeover (TO) sequence on the surviving node (i.e., the partner node). Data availability is typically guaranteed by mirroring the operations serviced and logged, but not yet committed (i.e., persistently stored) to the disks at the local node to the HA partner node. Such mirroring typically occurs over a high speed connection between non-volatile random access memory (NVRAM) hardware on both nodes.

High performance is also typically guaranteed in such a cluster by providing an alternate channel in which the partner node acts a proxy, redirecting a data access request issued by a client (e.g., an application) to the owner node of the storage container (e.g., aggregate) to which the request is directed. To redirect the request, the partner node typically examines the final recipient of the request (e.g., using a global data structure) and proxies the request to the appropriate owner node. The owner node subsequently processes the request and sends a response to the partner (redirector) node, which then relays the response to the requesting application.

To initiate the TO sequence, the partner node assumes control over the disks of the local node, mounts the storage containers (e.g., volumes) of the local node and replays the logged operations mirrored from the local node to the NVRAM of the partner node to essentially take over the storage service provided by the local node. Such replay includes persistent storage of the logged (serviced) operations to the disks; typically, replay of the logged operations is performed sequentially, i.e., one-by-one, by the partner node without any logical interpretation of the operations logged in its NVRAM. As a result, a substantial amount of the time associated with the TO sequence is consumed by NVRAM replay of the logged operations by the file system.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DESCRIPTION OF ILLUSTRATIVE EMBODIMENTS

Figure 1:
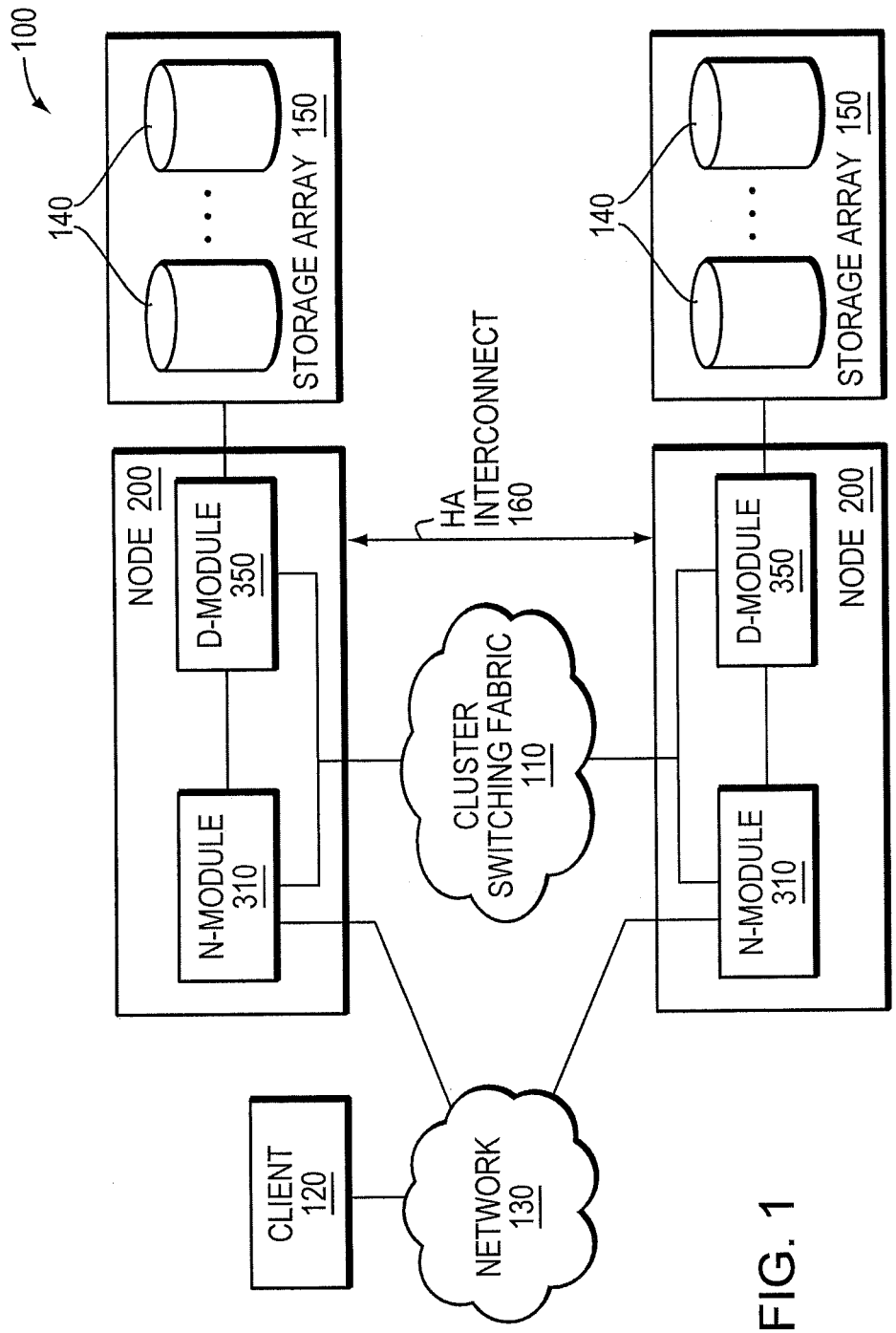
FIG. 1 is a block diagram of a plurality of nodes interconnected as a cluster.

The embodiments described herein provide a live non-volatile (NV) replay technique that enables a partner node to efficiently takeover a failed node of a high-availability (HA) pair in a multi-node storage cluster by dynamically replaying operations synchronously logged in a non-volatile random access memory (NVRAM) of the partner node, while also providing high performance during normal operation. Dynamic live replay may be effected through interpretation of metadata describing the logged operations. In an embodiment, the metadata may specify a location and type of each logged operation within a partner portion of the NVRAM, as well as whether there is any dependency among the logged operation and any other logged operations that would impose an ordering constraint requirement. During normal operation, the partner node may receive a request issued by a client (e.g., an application) to redirect (proxy) servicing of the request to an owner node of a storage container (e.g., aggregate) to which the request is directed. The partner node may examine the request and, in response, refer to the metadata of logged operations and decide to service the request by dynamically replaying one or more of the logged operations, thus providing high performance by offloading work from the owner node. In addition upon failure of the node, the partner node may replay, in parallel, those logged operations having no imposed ordering constraint, thereby substantially reducing time needed to complete takeover of the failed node.

In an embodiment, each node of the HA pair may include a direct memory access (DMA) controller configured to implement a remote direct memory access (RDMA) protocol for mirroring (copying) information maintained in the NVRAM of the node to the NVRAM of its partner node in the cluster. Illustratively, the information may include operations, such as data access requests, that are processed by a file system of the node, i.e., the local node, and logged in a local portion of the NVRAM of the local node, but not yet committed (i.e., persistently stored) to storage devices of the local node. The file system of the local node may also generate the metadata describing the type of each request, as well as its location and dependency among other requests logged in the NVRAM.

In response to the logging of each processed request, the DMA controller may invoke the RDMA protocol to copy the request from its location in the local portion of the NVRAM on the local node to a corresponding location in the partner portion of the NVRAM on the partner node. In addition, the DMA controller may transfer the metadata to a dependency index table of the partner node to synchronize the local and partner nodes with respect to the logged requests. During normal operation, a semantic replay parser of the partner node may be consulted to determine whether an application's request can be satisfied by the partner node without redirecting to the owner node. If so, the semantic replay parser may cooperate with a file system of the partner node to perform live replay of one or more logged requests, e.g., in chronological order, to thereby service the request at the partner node. The partner node may further decide to discard data accumulated from the live replay, if necessary. Otherwise, the data may be retained to enable efficient takeover in the event of failure of the owner (e.g., local) node. Upon failure of the local node, the semantic replay parser of the partner node may interpret the metadata describing the logged requests of the NVRAM to determine which logged requests are not constrained by an ordering requirement and, thus, may be dynamically replayed in parallel. The semantic replay parser may then cooperate with the file system of the partner node to replay the non-constrained requests in parallel.

Advantageously, the live NV replay technique provides high availability to the nodes of the storage cluster without any substantial downtime by enabling the partner node to interpret the operations synchronously logged to its NVRAM from the local node and, thus, reduce the NVRAM replay time during a TO sequence associated with a failure of the local node. That is, the live NV replay technique enables the partner node to parallel process (i.e., for persistent storage) those logged operations having no imposed ordering constraint to substantially reduce the time needed to complete the TO sequence in response to failure of the node. Furthermore, the live NV replay technique provides high performance to applications without any substantial processing resource consumption. That is, the live NV replay technique may enable the partner node to process application requests directly without redirecting those requests to the owner node.

DESCRIPTION

Multi-Node Storage Cluster

FIG. 1 is a block diagram of a plurality of nodes 200 interconnected as a storage cluster 100 and configured to provide storage service relating to the organization of information on storage devices. The nodes 200 may be interconnected by a cluster switching fabric 110 which, in an embodiment, may be a Gigabit Ethernet switch. The nodes 200 may also be coupled by a high availability (HA) interconnect 160 to provide a HA partner arrangement that facilitates high data availability in the cluster, as described further herein. Each node 200 may include functional components that cooperate to provide a distributed storage architecture of the cluster 100. To that end, each node 200 is generally organized as a network element (N-module 310) and a disk element (D-module 350). The N-module 310 illustratively includes functionality that enables the node 200 to connect to one or more clients 120 over a computer network 130, while each D-module 350 includes functionality that enables the node to connect to one or more storage devices 140, such as disks, of a storage array 150 to thereby render the storage service in accordance with the distributed storage architecture.

It should be noted that while there is shown an equal number of N-modules and D-modules in the illustrative cluster 100, there may be differing numbers of N-modules and/or D-modules in accordance with various embodiments described herein. For example, there may be a plurality of N-modules and/or D-modules interconnected in a cluster configuration 100 that does not reflect a one-to-one correspondence between the N-modules and D-modules. As such, the description of a node 200 as including one N-module and one D-module should be taken as illustrative only. In addition, there may be two or more nodes 200 coupled together by the HA interconnect 160 to provide the HA partner arrangement.

In an embodiment, each client 120 may be a general-purpose computer configured to execute one or more applications to interact with the node 200 in accordance with a client/server model of information delivery. That is, the client may request the services of the node, and the node may return the results of the services requested by the client, by exchanging packets over the network 130. The client may issue packets including file-based access protocols, such as the Common Internet File System (CIFS) protocol or Network File System (NFS) protocol, over the Transmission Control Protocol/Internet Protocol (TCP/IP) when accessing information in the form of storage containers, such as files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of storage containers, such as blocks or logical units (luns).

Figure 2:
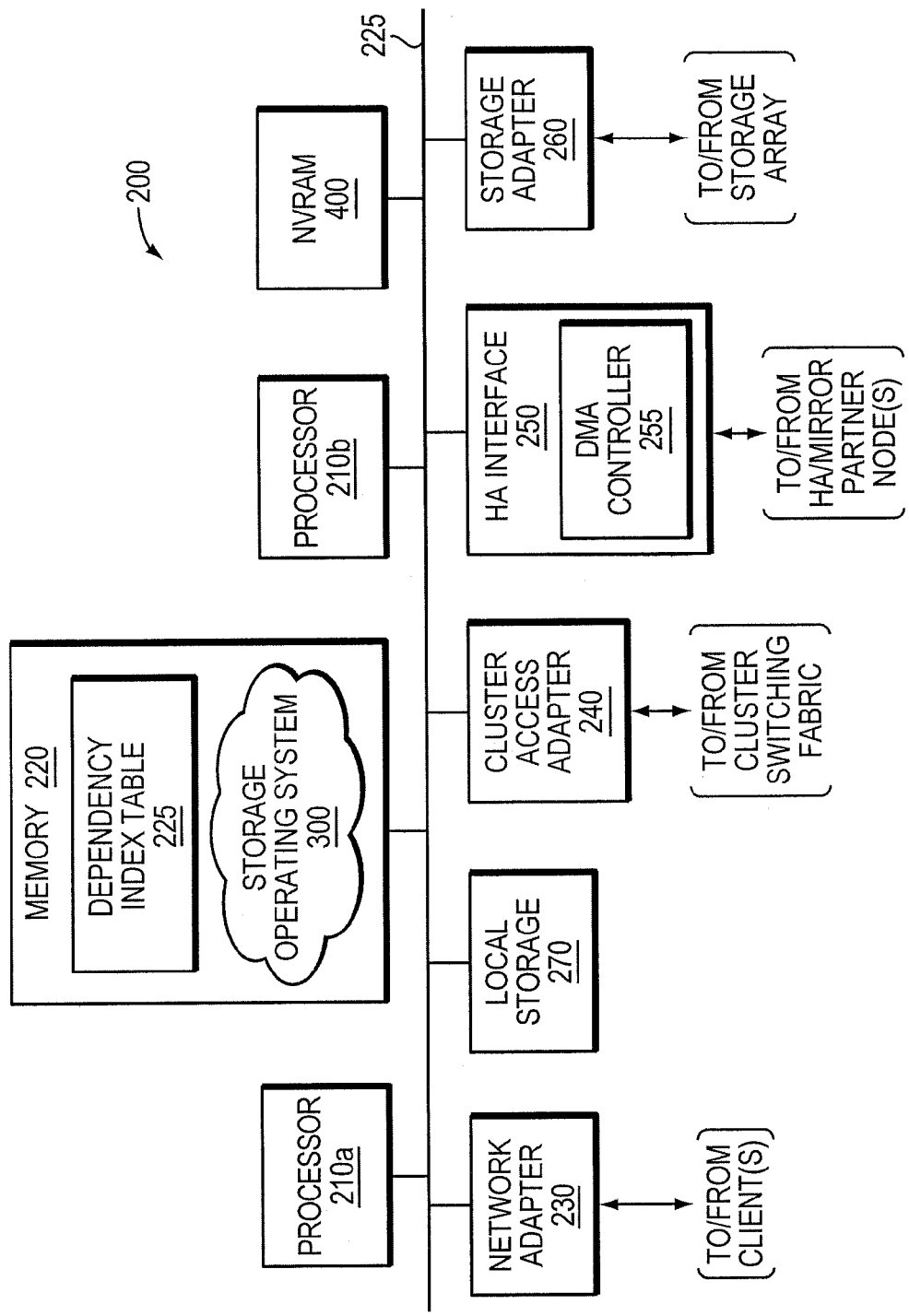
FIG. 2 is a block diagram of a node.

FIG. 2 is a block diagram of a node 200 that is illustratively embodied as a storage system having a plurality of processors 210a,b, a memory 220, a network adapter 230, a cluster access adapter 240, a HA interface 250, a storage adapter 260, local storage 270 and a non-volatile random access memory (NVRAM) 400 interconnected by a system interconnect 225, such as bus. In an embodiment, the local storage 270 may include one or more storage devices, such as solid state drives illustratively embodied as flash storage devices, utilized by the node to persistently store configuration information provided by one or more processes that execute as user or kernel mode processes on the node. The cluster access adapter 240 may include one or more ports adapted to couple the node 200 to other nodes of the cluster 100 via the cluster switching fabric 110. Illustratively, Ethernet may be used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 240 may be utilized by the N/D-module for communicating with other N/D-modules in the cluster 100.

Each node 200 may be embodied as a dual processor storage system executing a storage operating system 300 that illustratively implements a high-level module, such as a file system, to logically organize the information as a hierarchical structure of named storage containers, such as directories, files and/or aggregates having one or more volumes that hold files and/or luns. However, it will be apparent to those of ordinary skill in the art that the node 200 may alternatively embody a single or more than two processor system. Illustratively, one processor 210a executes the functions of the N-module 310 on the node, while the other processor 210b executes the functions of the D-module 350.

The memory 220 may include memory locations that are addressable by the processors and adapters for storing software programs and/or processes and data structures associated with the embodiments described herein. The processor and adapters may, in turn, include processing elements and/or logic circuitry configured to execute the software programs/processes and manipulate the data structures, such as dependency index table 225. In addition, the processing elements of the adapters may be configured to offload some or all of the packet processing and storage access operations, respectively, from processors 210 to thereby increase the performance of the storage service provided by the node. The storage operating system 300, portions of which are typically resident in memory and executed by the processing elements, functionally organizes the node 200 by, inter alia, invoking operations in support of the storage service implemented by the node.

It will be apparent to those skilled in the art that other processing and memory means, including various computer readable media, may be used for storing and executing program instructions pertaining to the embodiments herein. It is also expressly contemplated that the various processes, software layers, architectures and procedures described herein can be implemented in hardware, firmware, software or a combination thereof. Moreover, it is expressly contemplated that the various software programs, processes and layers described herein may be embodied as modules configured to operate in accordance with the disclosure, e.g., according to the functionality of a similar program, process or layer.

The network adapter 230 may include one or more ports adapted to couple the node 200 to the client(s) 120 over computer network 130, which may include one or more point-to-point links, wide area networks, virtual private networks implemented over a public network (Internet) or a shared local area network. The network adapter 230 may thus include the mechanical, electrical and signaling circuitry needed to connect the node to the network which, illustratively, may embody an Ethernet network or a Fibre Channel (FC) network. In an embodiment, the network adapter 230 may include a conventional network interface controller (NIC) or, alternatively, a TCP/IP offload engine (TOE) and/or an iSCSI target host bus adapter (HBA), each of which may provide a level of acceleration for use with the iSCSI protocol. In alternate embodiments, there may be a plurality of network adapters, each of which may accept iSCSI connections.

The storage adapter 260 illustratively cooperates with the storage operating system 300 executing on the node 200 to access information requested by the client. The information may be stored on any type of attached array of writable storage device media such as video tape, optical, DVD, magnetic tape, bubble memory, electronic random access memory, micro-electro mechanical and any other similar media adapted to store information, including data and parity information. However, the information is illustratively stored on the disks 140 of array 150. The storage adapter may include one or more ports having input/output (I/O) interface circuitry that couples to the disks over an I/O interconnect arrangement, such as a conventional serial attached SCSI (SAS) or FC link topology.

Storage of information on each array 150 is illustratively implemented as one or more storage "volumes" that include a collection of physical storage disks 140 cooperating to define an overall logical arrangement of volume block number space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the embodiments herein.

The NVRAM 400 may include a back-up battery or other built-in last-state retention capability (e.g., non-volatile semiconductor memory such as storage class memory) that is capable of maintaining information in light of a failure to the node and cluster environment. The HA interface 250 may include port circuitry adapted to couple the node 200 to one or more partner nodes of the cluster 100 via the HA interconnect 160. In an embodiment, the HA interface may also include a direct memory access (DMA) controller 255 configured to implement a remote direct memory access (RDMA) protocol adapted to provide inter-node and/or inter-module communications. An example RDMA protocol is described in Request for Comments No. 5040 ("RFC 5040") entitled *A Remote Direct Memory Access Protocol Specification*, by R. Recio et al (October 2007). Illustratively, the DMA controller 255 may utilize any form of RDMA transport protocol, including iWARP, FC, Infiniband or RoCE. The HA interconnect is illustratively a high-speed connection between the nodes that may be used to mirror information stored in the NVRAM among the partner nodes to facilitate high data availability in the cluster. The HA interconnect 160 may embody various types of high-speed connection media, such as Infiniband; however, in an embodiment, the interconnect is illustratively implemented as a switched network, such as Ethernet.

Storage Operating System

To facilitate access to the disks 140, the storage operating system 300 illustratively implements a write-anywhere file system that cooperates with one or more virtualization modules to "virtualize" the storage space provided by disks 140. The file system logically organizes the information as a hierarchical structure of named storage containers, such as directories and files, on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of storage containers, such as blocks, on the disks that are exported as named luns. In an embodiment, the storage operating system is preferably the NetApp® Data ONTAP™ operating system available from NetApp Inc., Sunnyvale, Calif. that implements a Write Anywhere File Layout (WAFL®) file system. However, it is expressly contemplated that any appropriate storage operating system may be enhanced for use in accordance with the embodiments described herein.

Figure 3:
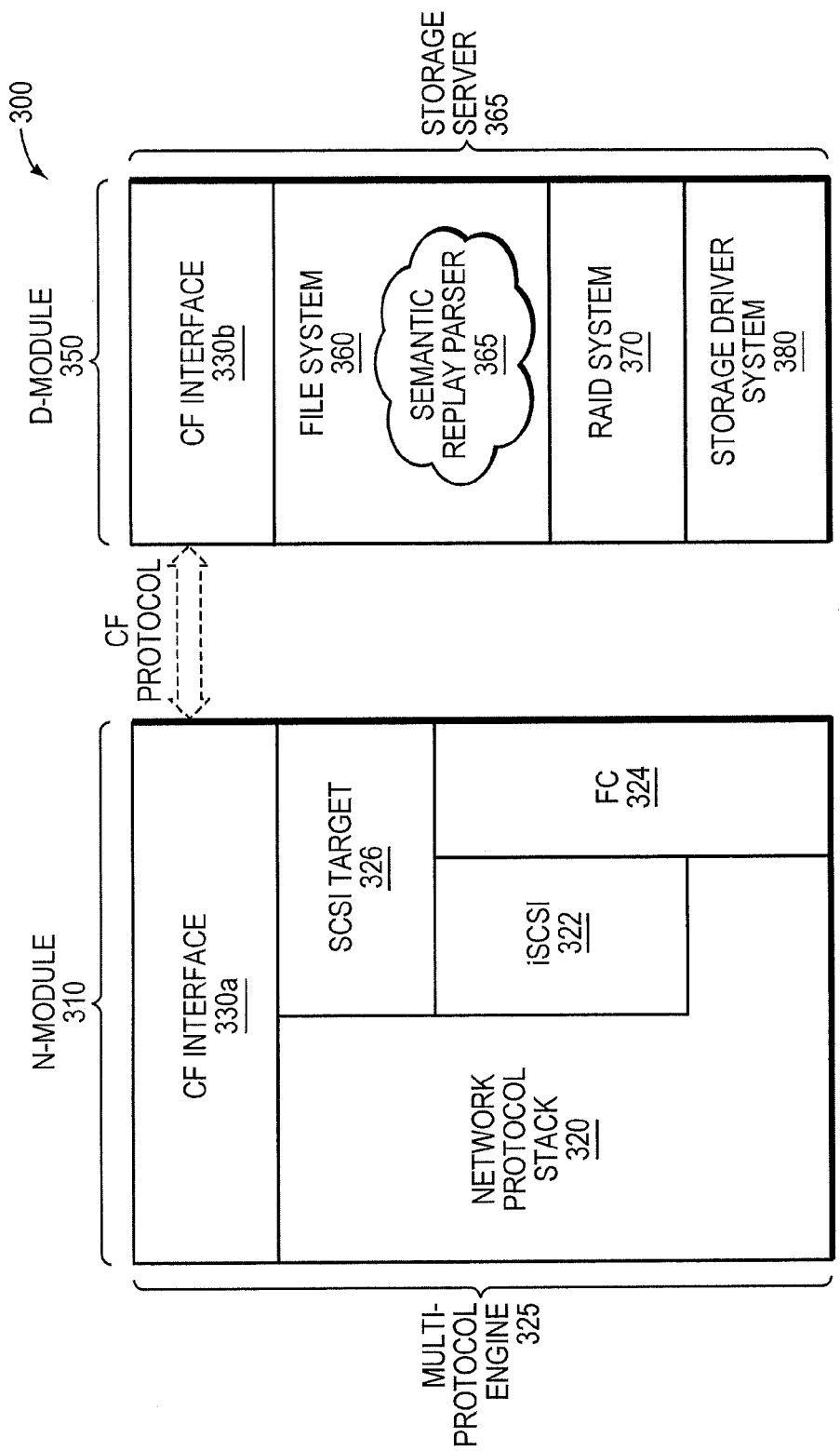
FIG. 3 is a block diagram of a storage operating system.

FIG. 3 is a block diagram of the storage operating system 300 that may be advantageously used with the embodiments described herein. In an embodiment, the storage operating system includes a series of software layers organized to form a multi-protocol engine 325 that provides data paths for clients to access information stored on the node using file and block access protocols. The multi-protocol engine 325 may be embodied as a network protocol stack 320 that includes a media access layer of network drivers (e.g., gigabit Ethernet drivers) configured to interface to network protocol layers, such as an IP layer and its supporting transport mechanisms, a TCP layer and a User Datagram Protocol (UDP) layer. The network protocol stack 320 may also include a file system protocol layer configured to provide multi-protocol file access and, to that end, includes support for the Direct Access File System (DAFS) protocol, the NFS protocol, the CIFS protocol and the Hypertext Transfer Protocol (HTTP) protocol. A VI layer may implement a VI architecture to provide direct access transport (DAT) capabilities, such as RDMA, in accordance with the DAFS protocol.

In an embodiment, the multi-protocol engine 325 also includes an iSCSI driver layer 322 configured to provide block protocol access over the TCP/IP network protocol layers, and a FC driver layer 324 configured to receive and transmit block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system 300 includes a series of software layers organized to form a storage server 365 that provides, inter alia, data paths for accessing information stored on the disks 140 of the node 200. To that end, the storage server 365 includes a file system 360, a RAID system module 370 and a storage driver system 380. In an embodiment, the file system 360 includes a semantic replay parser 365, which is implemented as a kernel process configured to interpret metadata stored in the dependency index table 225 in accordance with a live NV replay technique described herein. The RAID system 370 manages the storage and retrieval of information to and from the volumes/disks in accordance with I/O operations, while the storage driver system 380 implements a storage (disk) access protocol such as, e.g., the SCSI protocol.

Illustratively, the file system 360 implements a virtualization system of the storage operating system 300 through the interaction with one or more virtualization modules embodied as, e.g., a virtual disk (vdisk) module (not shown) and a SCSI target module 326. The vdisk module enables access by administrative interfaces in response to a user (system administrator) issuing commands to the node 200. The SCSI target module 326 is generally disposed between the iSCSI and FC drivers 322, 324 and the file system 360 to provide a translation layer of the virtualization system between a logical unit space and a file system space, where logical units are represented as named storage containers within the file system space.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

As used herein, the term "storage operating system" generally refers to the computer-executable code operable on a computer to perform a storage function that manages data access and may, in the case of a node 200, implement data access semantics of a general-purpose operating system. The storage operating system can also be implemented as a microkernel, an application program operating over a general-purpose operating system, such as UNIX® or Windows XP®, a general-purpose operating system with configurable functionality, or as one or more processes configured for storage applications as described herein.

In addition, it will be understood to those skilled in the art that the embodiments described herein may apply to any type of special-purpose (e.g., file server, filer or storage serving appliance) or general-purpose computer, including a standalone computer or portion thereof, embodied as or including a storage system. Moreover, the described embodiments can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the embodiments herein may be utilized with any suitable file system, including a write in place file system.

In an embodiment, the storage server 365 is embodied as D-module 350 of the storage operating system 300 to service one or more storage containers of array 150. In addition, the multi-protocol engine 325 is embodied as N-module 310 to (i) perform protocol termination with respect to a client issuing incoming data access request packets over the network 130, as well as (ii) redirect those data access requests to any storage server 365 of the cluster 100. Moreover, the N-module 310 and D-module 350 cooperate to provide a highly-scalable, distributed storage architecture of the cluster 100. To that end, each module includes a cluster fabric (CF) interface module 330a,b adapted to implement intra-cluster communication among the modules, including D-module-to-D-module communication.

The protocol layers, e.g., the NFS/CIFS layers and the iSCSI/FC layers in conjunction with the SCSI target layer, of the N-module 310 function as protocol servers that translate file-based and block-based data access requests from clients. As part of the processing of these requests, the N-module may request data services from the D-module 350. This may be achieved via operating system primitive operations (commands) that are embedded within CF messages by the CF interface module 330 for transmission to the nodes of the cluster 100. In an embodiment, the CF interface modules 330 cooperate to provide a single file system image across all D-modules 350 in the cluster 100. A data access request received by an N-module is processed by that N-module. As part of the processing, the N-module may send requests to one or more D-modules.

In an embodiment, the N-module 310 and D-module 350 may be implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 110. A known message-passing mechanism provided by the storage operating system to transfer information between modules (processes) is an Inter Process Communication (IPC) mechanism. The protocol used with the IPC mechanism is illustratively a generic file and/or block-based "agnostic" CF protocol that includes a collection of methods/functions constituting a CF application programming interface (API).

In an embodiment, the CF interface modules 330 may implement the CF protocol for communicating operating system commands among the nodes (modules) of cluster 100. Communication may illustratively be effected by the D-module exposing the CF API to which an N-module (or another D-module) issues calls. To that end, the CF interface module 340 may be organized as a CF encoder and CF decoder. The CF encoder, e.g., CF interface 330*a* on N-module 310, may encapsulate a CF message as (i) a local procedure call (LPC) when communicating an operating system command to a D-m module 350 residing on the same node 200 or (ii) a remote procedure call (RPC) when communicating the command to a D-module residing on a remote node of the cluster 100. In either case, the CF decoder, e.g., CF interface 330*b* on D-module 350, may de-encapsulate the CF message and process the command.

High Data Availability

In an embodiment, two or more nodes 200 of the cluster may be configured to provide takeover (TO) protection to each other in the event of a failure to one or more of the nodes. In order to implement a TO sequence in the event of such a failure, the nodes 200 may communicate among themselves across one or more communication links, such as the cluster switching fabric 110, to establish a HA partner arrangement. Each node 200 may maintain information relating to status of hardware and software associated with the node, as well as status of data access requests (operations) serviced and logged by the node. Illustratively, the status of the logged operations may indicate that the operations have not yet been committed (i.e., persistently stored) to the storage devices, such as disks 140, of the node. The information is illustratively maintained in the NVRAM 400 of the node (i.e., the local node) and, to guarantee high data availability, copied (mirrored) over the HA interconnect 160 to the NVRAM of a partner node associated with the local node in accordance with the established HA partner arrangement to synchronize the local and partner nodes with respect to the mirrored information. An example of a storage environment configured to synchronize nodes of a cluster by mirroring information between the nodes is generally described in U.S. patent application Ser. No. 13/456,654 titled Storage Environment with Symmetric Frontend and Asymmetric Backend, filed Apr. 26, 2012.

Figure 4:
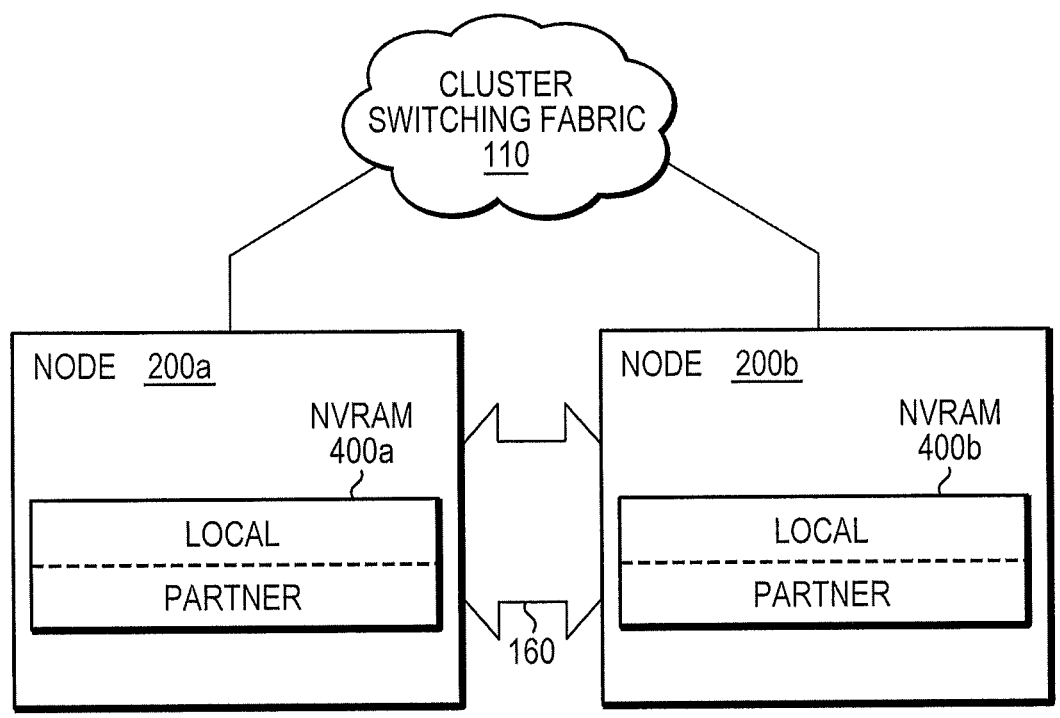
FIG. 4 illustrates an organization of a non-volatile random access memory (NVRAM) in accordance with a high availability (HA) partner arrangement in a multi-node storage cluster.

FIG. 4 illustrates an organization of the NVRAM 400 in accordance with a HA partner arrangement that facilitates high data availability in a multi-node storage cluster. The NVRAM 400*a,b* of each node is illustratively organized into two portions. A first portion (i.e., the "LOCAL" portion) of the NVRAM may store information about the hardware and software, including logged operations, of the local node, and a second portion (i.e., the "PARTNER" portion) of the NVRAM may store similar, mirrored information associated with its partner node. For example, assume the operations include data access requests, such as write requests. The local node (e.g., node 200*a*) may receive and execute (i.e., process) the operations and then record (i.e., log) the operations to the LOCAL portion of the NVRAM 400*a* prior to committing the processed operations to persistent storage (e.g., disk 140). Thereafter, the local node 200*a* may mirror the operations over the HA interconnect 160 to the PARTNER portion of the NVRAM 400*b* on its partner node (e.g., node 200*b*) to synchronize the local and partner nodes with respect to the mirrored operations.

In response to a failure of the local node, the partner node may initiate a TO sequence that essentially takes over the storage service provided by the local node by, inter alia, replaying the mirrored operations logged in the PARTNER portion of the NVRAM 400*b*. Such replay may involve persistent storage of the (processed) operations to the disk; typically, replay of the operations is performed sequentially, i.e., starting at a first operation logged in the PARTNER portion of the NVRAM and proceeding one-by-one to the last operation logged in the PARTNER portion. Notably, the file system 360 of the partner node generally performs NVRAM replay without interpretation of the operations logged in the PARTNER portion of the NVRAM 400*b*. As a result, a substantial amount of the time associated with the TO sequence is consumed by the NVRAM replay of the logged operations by the file system. The embodiments described herein are directed, in part, to reducing the NVRAM replay time during a TO sequence.

Live NV Replay

The embodiments described herein provide a live non-volatile (NV) replay technique that enables a partner node to efficiently takeover a failed node of a HA pair in a multi-node storage cluster by dynamically replaying operations synchronously logged in a NVRAM of the partner node, while also providing high performance during normal operation. Dynamic live replay may be effected through interpretation of metadata describing the operations logged in the NVRAM. In an embodiment, the metadata may specify a location and type of each logged operation within the PARTNER portion of the NVRAM, as well as whether there is any dependency among the logged operation and any other logged operations that would impose an ordering constraint requirement. For example, assume contents of the PARTNER portion of the NVRAM include ten (10) operations, e.g., write requests, each of which is directed to a different storage container, e.g., file. Interpretation of the write requests may reveal that the requests may be replayed, i.e., processed for persistent storage, in parallel since there is no dependency (e.g., overlap) among the operations that would impose an ordering constraint requirement. Accordingly, the partner node may replay the operations in parallel upon failure of the node, thereby substantially reducing time needed to complete takeover of the failed node.

During normal operation, the partner node may receive a request issued by a client (e.g., an application) to redirect (proxy) servicing of the request to an owner node of a storage container (e.g., aggregate) to which the request is directed. In an embodiment, the dynamic live NV replay technique may also be employed to provide high performance by servicing the application request directly from the partner node. Illustratively, the partner node may examine the request and, in response, refer to the metadata of logged operations and decide to service the request by dynamically replaying one or more of the logged operations, thus providing high performance by offloading work from the owner node.

Figure 5A:
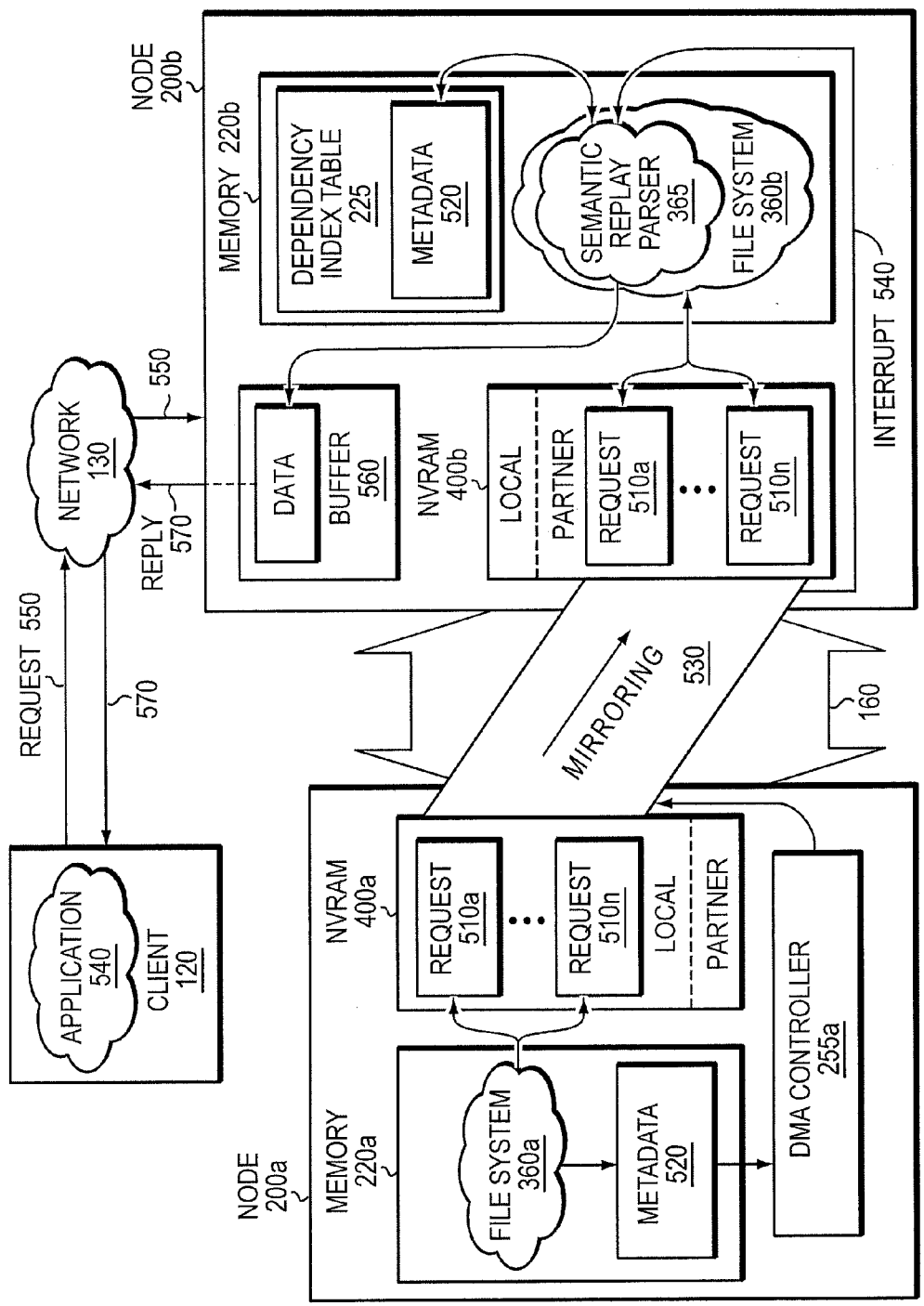
FIGS. 5A and B illustrate an exemplary live NV replay technique for dynamically replaying operations logged in the NVRAM.

FIGS. 5A and B illustrate an exemplary live NV replay technique for dynamically replaying operations logged in the NVRAM according to one or more embodiments described herein. In an embodiment, each node of an HA pair may include a DMA controller configured to implement the RDMA protocol used to mirror (copy) information, including operations, maintained in the NVRAM of the node to the NVRAM of its partner node in the cluster. Illustratively, the operations, e.g., data access requests such as write requests 510a-n, may be processed by the file system 360a of the local node 200a and logged in the LOCAL portion of the NVRAM 400a of that node; notably, the logged requests may not yet be committed (i.e., persistently stored) to the disks 140 of the local node. The file system 360a may also generate the metadata 520 describing each logged request, including its type, its location in the NVRAM and any dependency among other requests logged in the NVRAM. In the case of such a dependency, the request logged in the NVRAM may illustratively include an associated sequence number used to, e.g., impose ordering among the dependent requests.

In response to the logging of each processed request, the DMA controller 255a of the local node 200a may invoke the RDMA protocol to copy ("mirror") the request from its location in the LOCAL portion of the NVRAM 400a to a corresponding location in the PARTNER portion of the NVRAM 400b on the partner node 200b. In addition, the DMA controller may transfer the metadata 520 describing the request to dependency index table 225 residing in memory 220b of the partner node 200b to synchronize the local and partner nodes with respect to the logged requests. In an embodiment, the metadata 520 may be transferred over the HA interconnect 160 as part of mirroring 530 of the logged request and, thereafter, loaded into dependency index table 225 in response to an interrupt 540 that is generated by the RDMA protocol once the mirroring 530 completes. Illustratively, the interrupt 540 may provide the location (offset) of the metadata 520 in the dependency index table 225. In another embodiment, the metadata 520 may be transferred over the HA interconnect and loaded into the dependency index table using a separate, light-weight RDMA message that provides the offset of the metadata into the table 225.

In one or more embodiments, the semantic replay parser 365 of the partner node may handle the interrupt 540 generated by the RDMA protocol or receive the separate RDMA message to update the dependency index table 255 with the metadata 520 recorded at the appropriate location/offset. During normal operation (FIG. 5A), the semantic replay parser 365 may be consulted to determine whether a request 550 issued by an application 540 of client 120 can be satisfied by the partner node without redirecting to the owner node. If so, the semantic replay parser may cooperate with the file system 360b of the partner node to perform live replay of one or more logged requests to thereby service the request at the partner node. Illustratively, the semantic replay parser 365 may use the sequence numbers of the dependent operations logged in the PARTNER portion of the NVRAM 400b to replay, on-demand and chronologically, one or more of those operations to load the desired data blocks directly into memory buffers, e.g., buffer 560, of the request and reply 570 to the requesting application directly without executing redirection to the owner node. In this way, the partner node's proactive processing provides high throughput to the requesting application 540 for certain workloads. The partner node may further decide to discard data accumulated from the live replay, if necessary. Otherwise, the data may be retained to enable efficient takeover in the event of failure of the owner (e.g., local) node.

Figure 5B:
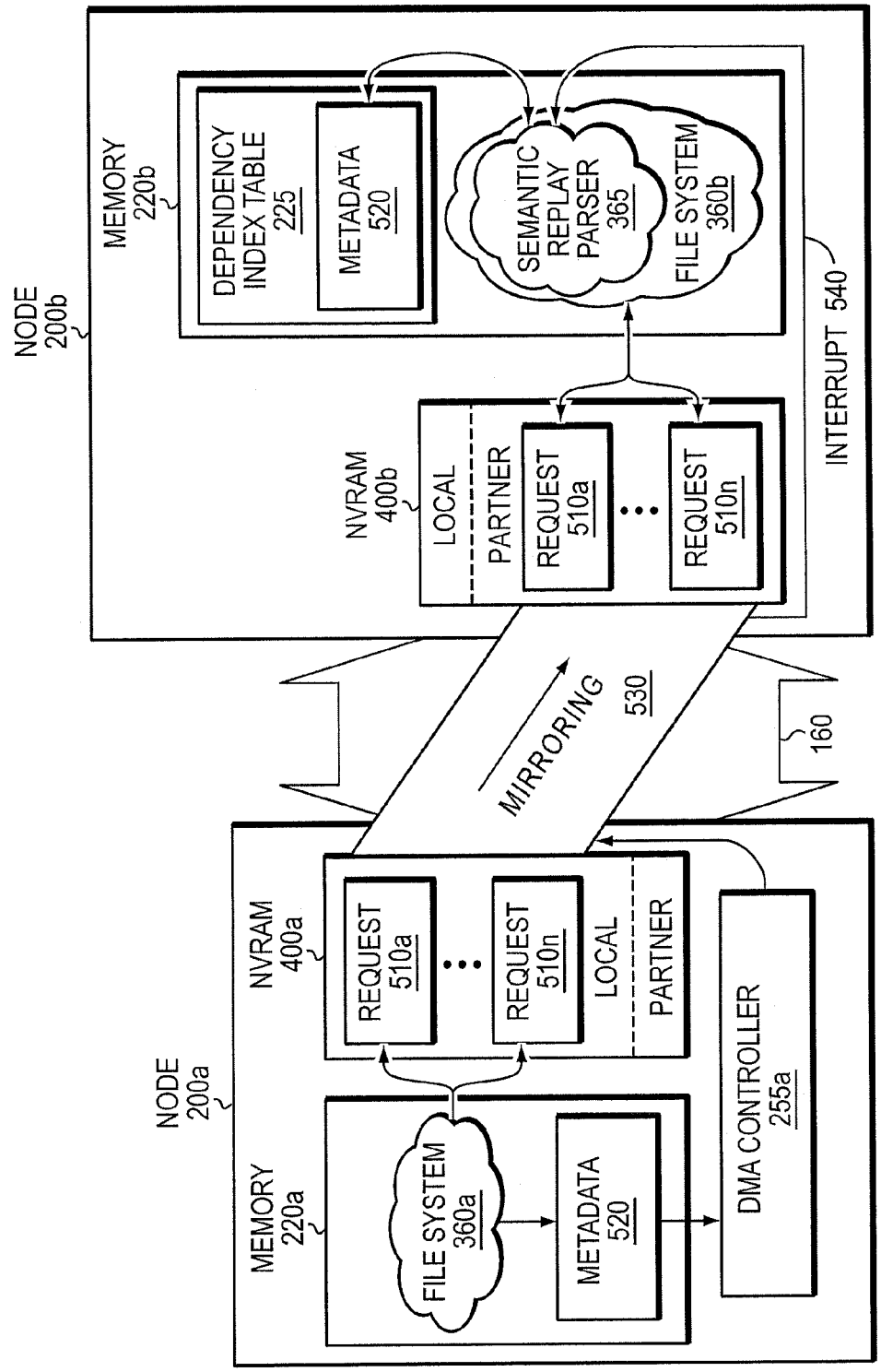

Upon failure of the local node 200a (FIG. 5B), the semantic replay parser 365 may interpret the metadata describing the requests 510a-n mirrored to the PARTNER portion of the NVRAM 400b to determine which logged requests are not constrained by an ordering requirement and, thus, may be dynamically replayed in parallel. In addition, the semantic replay parser 365 may use the sequence numbers of the logged requests having an ordering constraint to, e.g., chronologically arrange the overlapping requests for sequential processing. The semantic replay parser 365 may then cooperate with the file system 360b to replay the non-order constrained requests in parallel, as well as the order-constrained requests sequentially.

Figure 6:
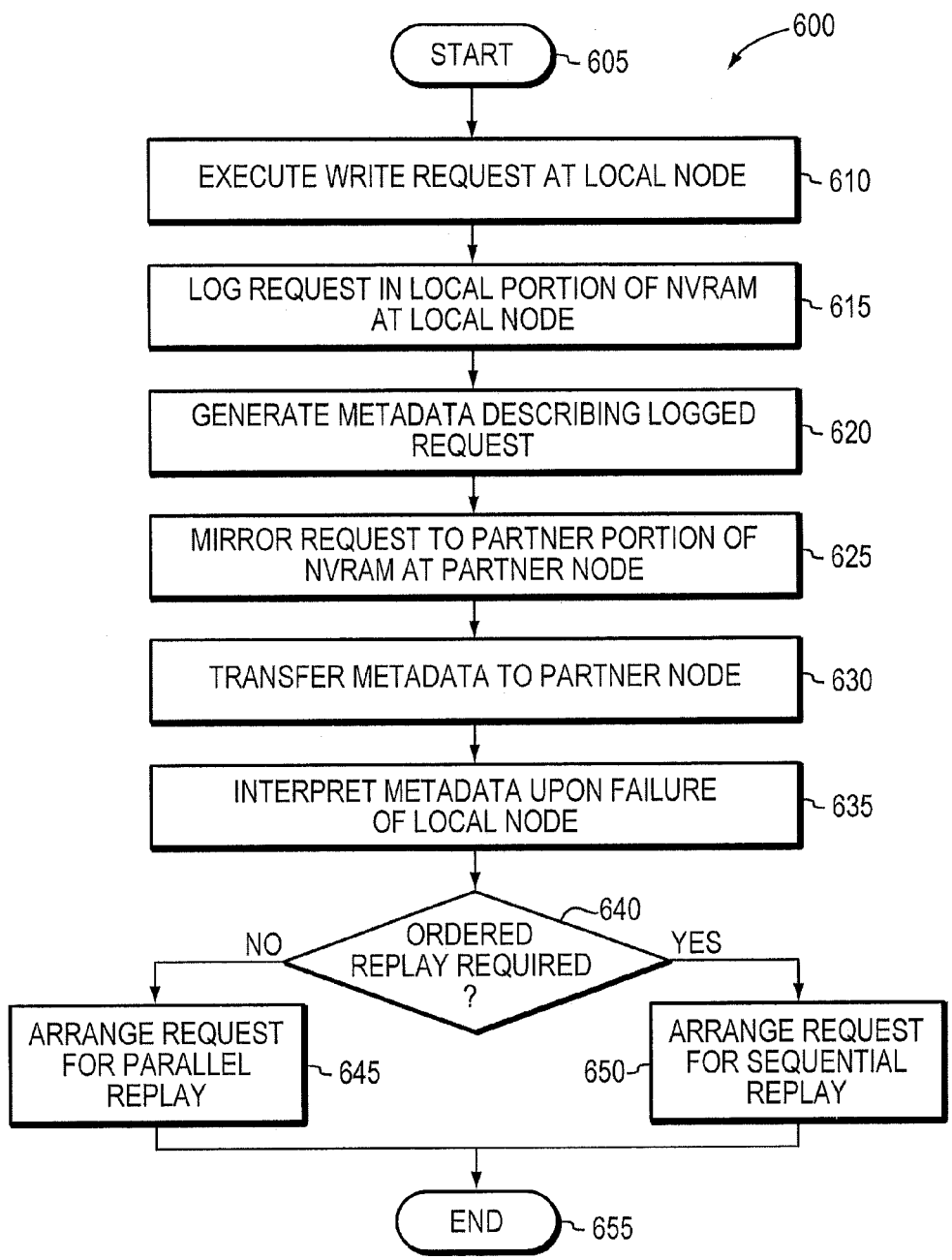
FIG. 6 is an example simplified procedure for dynamically replaying operations logged in the NVRAM to enable efficient takeover of a failed node of the HA partner arrangement in the multi-node storage cluster.

FIG. 6 is an example simplified procedure for dynamically replaying operations logged in the NVRAM to enable efficient takeover of a failed node of the HA partner arrangement in the multi-node storage cluster. The procedure 600 starts at step 605 and proceeds to step 610 where an operation, e.g., a write request, received at the local node is executed, e.g., by processor 210 and, at step 615, logged in the LOCAL portion of the NVRAM of the local node but not committed to the storage devices of the local node. At step 620, metadata describing the logged request is generated, e.g., by the file system of the local node, wherein the metadata includes a type of the request, a location of the request logged in the NVRAM and any dependency among the request and other requests logged in the NVRAM. At step 625, the request is mirrored, e.g., by the DMA controller of the local node, from its location in the LOCAL portion of the local node's NVRAM to a corresponding location in the PARTNER portion of the partner node's NVRAM. At step 630, the metadata is transferred, e.g., by the DMA controller, to the dependency index table of the partner node. At step 635, the metadata describing the logged request(s) is interpreted, e.g., by the semantic replay parser upon failure of the local node, to determine whether replay of the logged request requires ordering. At step 640, a determination is made as to whether ordered replay of the logged request is required due to dependency, e.g., overlap, among the logged request and any other logged requests that would impose an ordering constraint. If ordering is not required, the logged request is arranged for parallel replay with the other logged requests, e.g., by the semantic replay parser in cooperation with the file system of the partner node at step 645. Otherwise, the overlapping requests are arranged for sequential replay at step 650 and the procedure ends at step 655.

While there have been shown and described illustrative embodiments for providing a live NV replay technique that enables a partner node to efficiently takeover a failed node of a HA pair in a multi-node storage cluster, it is to be understood that various other adaptations and modifications may be made within the spirit and scope of the embodiments herein. For example, embodiments have been shown and described herein with relation to a partner node dynamically replaying operations synchronously logged in the PARTNER portion of its NVRAM. However, the embodiments in their broader sense are not so limited, and may, in fact, also allow for a local node to dynamically replay operations, e.g., write requests, synchronously logged in the PARTNER portion of its NVRAM. Here, the DMA controller of the partner node may invoke the RDMA protocol to copy a logged write request from its location in the LOCAL portion of the NVRAM on the partner node to a corresponding location in the PARTNER portion of the NVRAM on the local node. In addition, the DMA controller may transfer the metadata to a dependency index table located in the memory of the local node to synchronize the local and partner nodes with respect to the logged requests. Upon failure of the partner node, a semantic replay parser of the local node may interpret the logged requests of the NVRAM using the metadata stored in the dependency index table to determine which logged requests are not constrained by an ordering requirement and, thus, may be dynamically replayed in parallel.

Advantageously, the live NV replay technique provides high availability to the nodes of the storage cluster without any substantial downtime by enabling the partner node to interpret the operations synchronously logged to its NVRAM from the local node and, thus, reduce the NVRAM replay time during a TO sequence associated with a failure of the local node. That is, the live NV replay technique enables the partner node to parallel process (i.e., for persistent storage) those logged operations having no imposed ordering constraint to substantially reduce the time needed to complete the TO sequence in response to failure of the node. Furthermore, the live NV replay technique provides high performance to applications without any substantial processing resource consumption during normal operation. In particular, the live NV replay technique provides high performance in the form of high throughput to certain workloads by consulting the dependency index table to identify dependent operations and subsequently live-replaying those operations dynamically to load data into a requesting application's buffers without executing redirection to the owner node The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:
   one or more processors of a partner node interconnected to a local node of a multi-node storage cluster;
   a non-volatile random access memory (NVRAM) connected to the one or more processors, the NVRAM configured to maintain operations serviced and logged by the local node, but not committed to storage devices of the local node; and
   a memory coupled to the one or more processors and configured to store metadata describing a type of each operation logged in the NVRAM, the metadata further describing a location of the logged operation in the NVRAM and any dependency among the logged operation and other logged operations in the NVRAM, the memory further configured to store a storage operating system implemented as one or processes executable by the one or more processors to, upon failure of the local node, interpret the metadata to dynamically replay in parallel any logged operations not constrained by an ordering requirement.

2. The system of claim 1 wherein the NVRAM is organized into a local portion and a partner portion, and wherein the logged operations serviced by the local node are maintained in the partner portion of the NVRAM.

3. The system of claim 1 wherein the metadata is stored in a dependency index table of the memory.

4. The system of claim 3 wherein the one or more processes comprises a semantic replay parser configured to interpret the metadata stored in the dependency index table.

5. The system of claim 4 wherein the semantic replay parser cooperates with a file system of the storage operating system to replay the logged operations not constrained by the ordering requirement.

6. A method comprising:
   executing an operation at a local node of multi-node storage cluster, the local node coupled to a partner node of the cluster by a high availability (HA) interconnect;
   logging the operation in a first non-volatile random access memory (NVRAM) of the local node;
   generating metadata describing the logged operation at the local node;
   mirroring the logged operation from the first NVRAM to a second NVRAM on the partner node;
   transferring the metadata to a dependency index data structure of the partner node;
   receiving a request issued by an application at the partner node to redirect servicing of the request to the local node;
   interpreting the metadata at a semantic replay parser of the partner node to determine whether replay of the logged operation requires ordering due to a dependency among other operations logged in the second NVRAM; and
   dynamically replaying one or more of the logged operations having the dependency to service the request at the partner node without redirecting service to the local node.

7. The method of claim 6 wherein logging the request comprises:
   logging the operation in a local portion of the first NVRAM.

8. The method of claim 7 wherein generating the metadata comprises:
   generating the metadata to include a type of the operation, a location of the operation logged in the local portion of the first NVRAM and any dependency among the operation and the other operations logged in the local portion of the first NVRAM.

9. The method of claim 8 wherein mirroring comprises:
   mirroring the operation from the location in the local portion of the first NVRAM to a corresponding location in a partner portion of a second NVRAM on the partner node.

10. The method of claim 9 further comprising:
    determining whether ordered replay of the request is required due to overlap among the operation and the other operations that would impose an ordering constraint.

11. The method of claim 10 further comprising:
    if ordering is not required, arranging the operation for parallel replay with the other operations upon failure of the local node.

12. The method of claim 10 further comprising:
    if ordering is required, arranging the overlapping requests for sequential replay upon failure of the local node.

13. A system comprising:
    one or more processors of a local node interconnected by a cluster switching fabric to a plurality of nodes, wherein the local node is further coupled to a partner node by a high availability (HA) interconnect;
    a first non-volatile random access memory (NVRAM) connected to the one or more processors, the first NVRAM having a local portion configured to maintain operations logged and serviced by the local node, but not yet committed to storage devices of the local node; and
    a memory coupled to the one or more processors and configured to store a storage operating system implemented as one or processes executable by the one or more processors to generate metadata describing a type of each operation logged in the local portion of the first NVRAM, the metadata further describing a location of each logged operation in the local portion of the first NVRAM and any dependency among the logged operations in the local portion of the first NVRAM.

14. The system of claim 13 further comprising a direct memory access (DMA) controller configured to mirror each logged operation over the HA interconnect to a partner portion of a second NVRAM on the partner node.

15. The system of claim 14 wherein the DMA controller is further configured to transfer the metadata over the HA interconnect to the partner node to synchronize the local and partner nodes with respect to the logged operation.

16. The system of claim 15 wherein the DMA controller is configured to mirror the logged operation and transfer the metadata using a remote direct memory access (RDMA) protocol.

17. The system of claim 16 wherein the metadata is transferred over the HA interconnect and loaded into a data structure of the partner node using a RDMA message that provides an offset of the metadata into the data structure.

18. The system of claim 16 wherein the metadata is transferred over the HA interconnect as part of the mirror of the logged operation.

19. The system of claim 18 wherein the metadata is loaded into a data structure of the partner node in response to an interrupt generated by the RDMA protocol once the mirror completes.

20. The system of claim 19 wherein the interrupt provides an offset of the metadata in the data structure.

* * * * *

UNITED STATES PATENT AND TRADEMARK OFFICE
CERTIFICATE OF CORRECTION

PATENT NO.         : 9,342,417 B2
APPLICATION NO.    : 14/280139
DATED              : May 17, 2016
INVENTOR(S)        : Ameya Prakash Usgaonkar and Siddhartha Nandi It is certified that error appears in the above-identified patent and that said Letters Patent is hereby corrected as shown below:

In the Claims

In claim 1, at col. 13, line 54, add "more" immediately after "one or" and immediately before "processes".

In claim 13, at col. 15, line 1, add "more" immediately after "one or" and immediately before "processes".

Signed and Sealed this
Ninth Day of August, 2016

Michelle K. Lee
*Director of the United States Patent and Trademark Office*